US012133062B2

(12) United States Patent
Lee et al.

(10) Patent No.: US 12,133,062 B2
(45) Date of Patent: Oct. 29, 2024

(54) METHOD AND APPARATUS FOR RENDERING OBJECT-BASED AUDIO SIGNAL CONSIDERING OBSTACLE

(71) Applicant: ELECTRONICS AND TELECOMMUNICATIONS RESEARCH INSTITUTE, Daejeon (KR)

(72) Inventors: Yong Ju Lee, Daejeon (KR); Jae-Hyoun Yoo, Daejeon (KR); Dae Young Jang, Daejeon (KR); Kyeongok Kang, Daejeon (KR); Tae Jin Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 117 days.

(21) Appl. No.: 17/713,059

(22) Filed: Apr. 4, 2022

(65) Prior Publication Data

US 2023/0224661 A1 Jul. 13, 2023

(30) Foreign Application Priority Data

Jan. 7, 2022 (KR) ........................ 10-2022-0002808

(51) Int. Cl.
*H04S 7/00* (2006.01)
*H04S 5/00* (2006.01)

(52) U.S. Cl.
CPC .............. *H04S 7/302* (2013.01); *H04S 5/005* (2013.01); *H04S 2400/11* (2013.01); *H04S 2420/01* (2013.01)

(58) Field of Classification Search
CPC ...... H04S 7/302; H04S 5/005; H04S 2400/11; H04S 2420/01
(Continued)

(56) References Cited

U.S. PATENT DOCUMENTS 8,494,666 B2 7/2013 Seo
9,122,053 B2 9/2015 Geisner
(Continued)

FOREIGN PATENT DOCUMENTS

EP 2 279 618 B1 4/2014
WO WO-2019066348 A1 * 4/2019
(Continued)

OTHER PUBLICATIONS

Pisha et al. ("Approximate diffraction modeling for real-time sound propagation simulation," The journal of the Acoustical Society of America, 2020, vol. 148, Issue 4, pp. 1922-1933) (Year: 2020).*
(Continued)

*Primary Examiner* — Paul Kim

(57) ABSTRACT

A method and apparatus for rendering an object-based audio signal considering an obstacle are disclosed. A method for rendering an object-based audio signal according to an example embodiment, the method includes identifying an object-based input signal and metadata for the input signal, generating a binaural filter based on the metadata using a binaural room impulse response (BRIR), determining, based on the metadata, whether an obstacle is present between a listener and an object, modifying the generated binaural filter when it is determined that the obstacle is present, and generating a rendered output signal by convolving the modified binaural filter and the input signal.

4 Claims, 7 Drawing Sheets

(58) Field of Classification Search
USPC .......................................................... 381/303
See application file for complete search history.

(56) References Cited

U.S. PATENT DOCUMENTS

| | | | | |
|---|---|---|---|---|
| 2015/0063610 | A1 | 3/2015 | Mossner | |
| 2019/0208345 | A1 | 7/2019 | Mindlin | |
| 2020/0314583 | A1* | 10/2020 | Robinson | H04R 5/04 |
| 2020/0382897 | A1* | 12/2020 | Mindlin | H04S 7/307 |

FOREIGN PATENT DOCUMENTS

| | | | |
|---|---|---|---|
| WO | 2020/009350 | A1 | 1/2020 |
| WO | 2020/197839 | A1 | 10/2020 |

OTHER PUBLICATIONS

What is Project Acoustics, https://docs.microsoft.com/en-us/gaming/acoustics/what-is-acoustics article, Microsoft Article, Apr. 27, 2021, 6 pages.

Resonance Audio: Multi-platform spatial audio at scale, https://blog.google/products/google-ar-vr/resonance-audio-multi-platform-spatial-audio-scale/, Nov. 6, 2017, pp. 1-6.

Google launches Resonan new spatial audio SDK, https://blog.google/products/google-ar-vr/resonance-audio-multi-platform-spatial audio-scale/, Nov. 7, 2017, pp. 1-11.

Google Releases ‘Resonance Audio’, a New Multi-Platform Spatial Audio SDK, https://blog.google/products/google-ar-vr/resonance-audio-multi-platform-spatial audio-scale/, Nov. 6, 2017, pp. 1-4.

Marcin Gorzel et al., Efficient Encoding and Decoding of Binaural Sound with Resonance Audio, AES Conference, Mar. 27-29, 2019, pp. 1-12.

Web Audio Processing: Use Cases and Requirements, https://www.w3.org/TR/webaudio-usecases/, W3CWorking Group Note, Jan. 29, 2013, 17 pages.

Louis Pisha et al., “Approximate diffraction modeling for real-time sound propagation simulation,” The Journal of the Acoustical Society of America, 2020, vol. 148, Issue 4, pp. 1922-1933.

* cited by examiner

METHOD AND APPARATUS FOR RENDERING OBJECT-BASED AUDIO SIGNAL CONSIDERING OBSTACLE

CROSS-REFERENCE TO RELATED APPLICATION

This application claims the benefit of Korean Patent Application No. 10-2022-0002808 filed on Jan. 7, 2022, in the Korean Intellectual Property Office, the entire disclosure of which is incorporated herein by reference for all purposes.

BACKGROUND

1. Field of the Invention

One or more example embodiments relate to a method and apparatus for rendering an object-based audio signal considering an obstacle.

2. Description of the Related Art

Recently, a technology for rendering an object-based audio signal has been applied to generate a realistic audio signal in virtual reality or a game. MPEG-H 3D audio standards include object audio and scene audio along with channel audio, and thus include a method for rendering object audio.

Acoustic spatial information may be used for rendering an object-based audio signal. That is, when a listener receives an audio signal from a sound source in a specific space, the audio signal may be classified into a direct sound, an early reflection sound, and a late reverberation sound. In order to generate a realistic spatial sound, spatial information may be considered in rendering the audio signal.

For example, an obstacle is present between the sound source and the listener in the specific space, the obstacle may affect transmission of the audio signal in various ways. An effect of the obstacle may vary depending on acoustic transmission characteristics of the obstacle (for example, reflectance, diffusivity, and transmittance), and reflecting such characteristics may increase complexity excessively. Therefore, there is a need for a method capable of simplifying and calculating an acoustic effect of the obstacle.

SUMMARY

Example embodiments provide a method and apparatus for simplifying and calculating an acoustic effect of an obstacle by determining whether the obstacle is present using metadata in rendering an object-based audio signal.

In addition, example embodiments provide a method and apparatus for performing rendering by applying a binaural filter according to whether an obstacle is present between a listener and a sound source using metadata in rendering an object-based audio signal.

According to an aspect, there is provided a method for rendering an object-based audio signal, the method including identifying an object-based input signal and metadata for the input signal, generating a binaural filter based on the metadata using a binaural room impulse response (BRIR), determining, based on the metadata, whether an obstacle is present between a listener and an object, modifying the generated binaural filter when it is determined that the obstacle is present, and generating a rendered output signal by convolving the modified binaural filter and the input signal.

The determining of whether the obstacle is present may include determining, based on a location of the listener, and a location of a sound source and acoustic geometry information included in the metadata, whether the obstacle is present.

The determining of whether the obstacle is present may include determining a direct sound transmission path of the input signal and a direct reflection sound transmission path of the input signal, and determining, based on the direct sound transmission path and the direct reflection sound transmission path, whether the obstacle is present.

The modifying of the generated binaural filter may include modifying direct reflection sound control information included in the generated binaural filter, and early reflection sound control information included in the generated binaural filter.

According to another aspect, there is provided a method for rendering an object-based audio signal, the method including identifying an object-based input signal and metadata for the input signal, determining, based on the metadata, whether an obstacle is present between a listener and an object, generating a binaural filter using the metadata according to whether the determined obstacle is present, and generating a rendered output signal by convolving the binaural filter and the input signal.

The determining of whether the obstacle is present may include determining, based on a location of the listener, and a location of a sound source and acoustic geometry information included in the metadata, whether the obstacle is present.

The determining of whether the obstacle is present may include determining a direct sound transmission path of the input signal and a direct reflection sound transmission path of the input signal, and determining, based on the direct sound transmission path and the direct reflection sound transmission path, whether the obstacle is present.

The generating of the binaural filter may include generating the binaural filter by modifying direct reflection sound control information and early reflection sound control information included in the binaural filter when it is determined that the obstacle is present.

According to still another aspect, there is provided a method for rendering an object-based audio signal, the method including identifying an object-based input signal and metadata for the input signal, generating a binaural filter based on the metadata using a BRIR, the binaural filter including direct sound control information, early reflection sound control information, and late reverberation sound control information of the input signal, determining, based on the metadata, whether an obstacle is present between a listener and an object, modifying, based on the direct sound control information and whether the obstacle is present, a direct sound of the input signal, modifying, based on the early reflection sound control information and whether the obstacle is present, an early reflection sound of the input signal, modifying, based on the late reverberation sound control information and whether the obstacle is present, a late reverberation sound of the input signal, and generating a rendered output signal by combining the modified direct sound of the input signal, the modified early reflection sound of the input signal, and the modified late reverberation sound of the input signal.

The determining of whether the obstacle is present may include determining, based on a location of the listener, and a location of a sound source and acoustic geometry information included in the metadata, whether the obstacle is present.

The determining of whether the obstacle is present may include determining a direct sound transmission path of the input signal and a direct reflection sound transmission path of the input signal, and determining, based on the direct sound transmission path and the direct reflection sound transmission path, whether the obstacle is present.

According to still another aspect, there is provided an apparatus for rendering an object-based audio signal, the apparatus including a processor. The processor may be configured to identify an object-based input signal and metadata for the input signal, generate a binaural filter based on the metadata using a BRIR, determine, based on the metadata, whether an obstacle is present between a listener and an object, modify the generated binaural filter when the obstacle is present, and generate a rendered output signal by convolving the modified binaural filter and the input signal.

The processor may be configured to determine, based on a location of the listener, and a location of a sound source and acoustic geometry information included in the metadata, whether the obstacle is present.

The processor may be configured to determine a direct sound transmission path of the input signal and a direct reflection sound transmission path of the input signal, and determine, based on the direct sound transmission path and the direct reflection sound transmission path, whether the obstacle is present.

The processor may be configured to modify direct reflection sound control information included in the generated binaural filter and early reflection sound control information included in the generated binaural filter.

Additional aspects of example embodiments will be set forth in part in the description which follows and, in part, will be apparent from the description, or may be learned by practice of the disclosure.

According to example embodiments, whether an obstacle is present may be determined using metadata in rendering an object-based audio signal, thereby simplifying and calculating an acoustic effect of the obstacle.

In addition, according to example embodiments, a binaural filter may be applied according to whether an obstacle is present between a listener and a sound source using metadata in rendering an object-based audio signal, thereby performing rendering.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
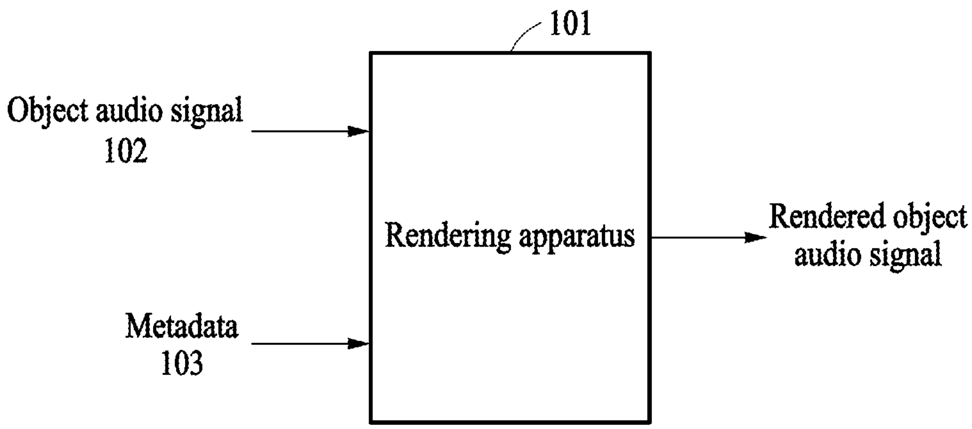
FIG. 1 is a block diagram illustrating a rendering apparatus according to example embodiments.

Hereinafter, example embodiments are described in detail with reference to the accompanying drawings. Various modifications may be made to the example embodiments. The example embodiments are not construed as being limited to the disclosure and should be understood to include all changes, equivalents, and replacements within the idea and the technical scope of the disclosure.

The terminology used herein is for the purpose of describing particular example embodiments only and is not to be limiting of the example embodiments. As used herein, the singular forms "a," "an," and "the" are intended to include the plural forms as well, unless the context clearly indicates otherwise. As used herein, the term "and/or" includes any one and any combination of any two or more of the associated listed items. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

In addition, when describing the example embodiments with reference to the accompanying drawings, like reference numerals refer to like components and a repeated description related thereto will be omitted. When describing the example embodiments, detailed description of well-known related structures or functions will be omitted when it is deemed that such description will cause ambiguous interpretation of the example embodiments.

FIG. 1 is a block diagram illustrating a rendering apparatus according to example embodiments.

In example embodiments, in rendering an object-based audio signal 102, whether an obstacle is present between a sound source and a listener may be determined, and a binaural filter may be modified considering whether the obstacle is present, thereby reflecting an acoustic effect of the obstacle to render the audio signal 102 realistically.

Referring to FIG. 1, a rendering apparatus 101 may include a processor. The processor of the rendering apparatus 101 may perform a rendering method according to example embodiments. Referring to FIG. 1, the rendering apparatus 101 may render, based on the object audio signal 102 and metadata 103, the audio signal 102. The object audio signal 102 may refer to the object-based audio signal 102.

The metadata 103 may include a gain of the audio signal 102, a distance between a sound source and the audio signal 102, a location of a listener, a location of the sound source, acoustic geometry information, and the like. The acoustic geometry information may refer to geometric information that may affect transmission of an acoustic signal. For example, the acoustic geometry information may be information on a location and size of a ceiling, wall, floor, column, desk, chair, and the like in three-dimensional (3D)

space that cause reflection, transmission, scattering, and diffraction of the acoustic signal, and may include acoustic transmission characteristic information such as reflectance and transmittance of a corresponding object. For example, in MPEG-I audio standardization, the acoustic geometry information may be provided in an encoder input format (EIF). 3D spatial information may be provided as mesh information.

In an example embodiment, whether an obstacle is present between a sound source and a listener may be determined using 3D spatial location information of a TV. When the obstacle is present, the rendering apparatus 101 may adjust a direct sound or direct reflection sound of the audio signal 102 using acoustic geometry information of the TV. The direct sound may refer to a direct path between an acoustic object and a person, and the direct reflection sound may refer to a path through which the acoustic object is reflected off a wall, ceiling, or floor, and is transmitted to the person.

According to example embodiments, the rendering apparatus 101 may generate an object-based output signal by rendering an input signal considering whether an obstacle is present between a sound source and a listener. The input signal, which is the audio signal 102 inputted into the rendering apparatus 101, may be a mono signal. The output signal, which is a rendered audio signal, may be a stereo signal.

In a first example embodiment, the rendering apparatus 101 may generate a binaural filter, and modify the binaural filter according to whether an obstacle is present between a sound source and a listener. The rendering apparatus 101 may generate an output signal by rendering an input signal using the modified binaural filter. A detailed description of the first example embodiment is described below with reference to FIGS. 2 and 3.

In a second example embodiment, in generating a binaural filter, the rendering apparatus 101 may generate the binaural filter considering whether an obstacle is present, and render an input signal using the generated binaural filter, thereby generating an output signal. A detailed description of the second example embodiment is described below with reference to FIGS. 4 and 5.

In a third embodiment, the rendering apparatus 101 may generate a binaural filter, modify, without convolution between an input signal and the binaural filter, a direct sound of the input signal, an early reflection sound of the input signal, and a late reverberation sound of the input signal according to whether an obstacle is present, and generate a rendered output signal by combining (mixing) results of the modification. A detailed description of the third example embodiment is described below with reference to FIGS. 6 and 7.

Figure 2:
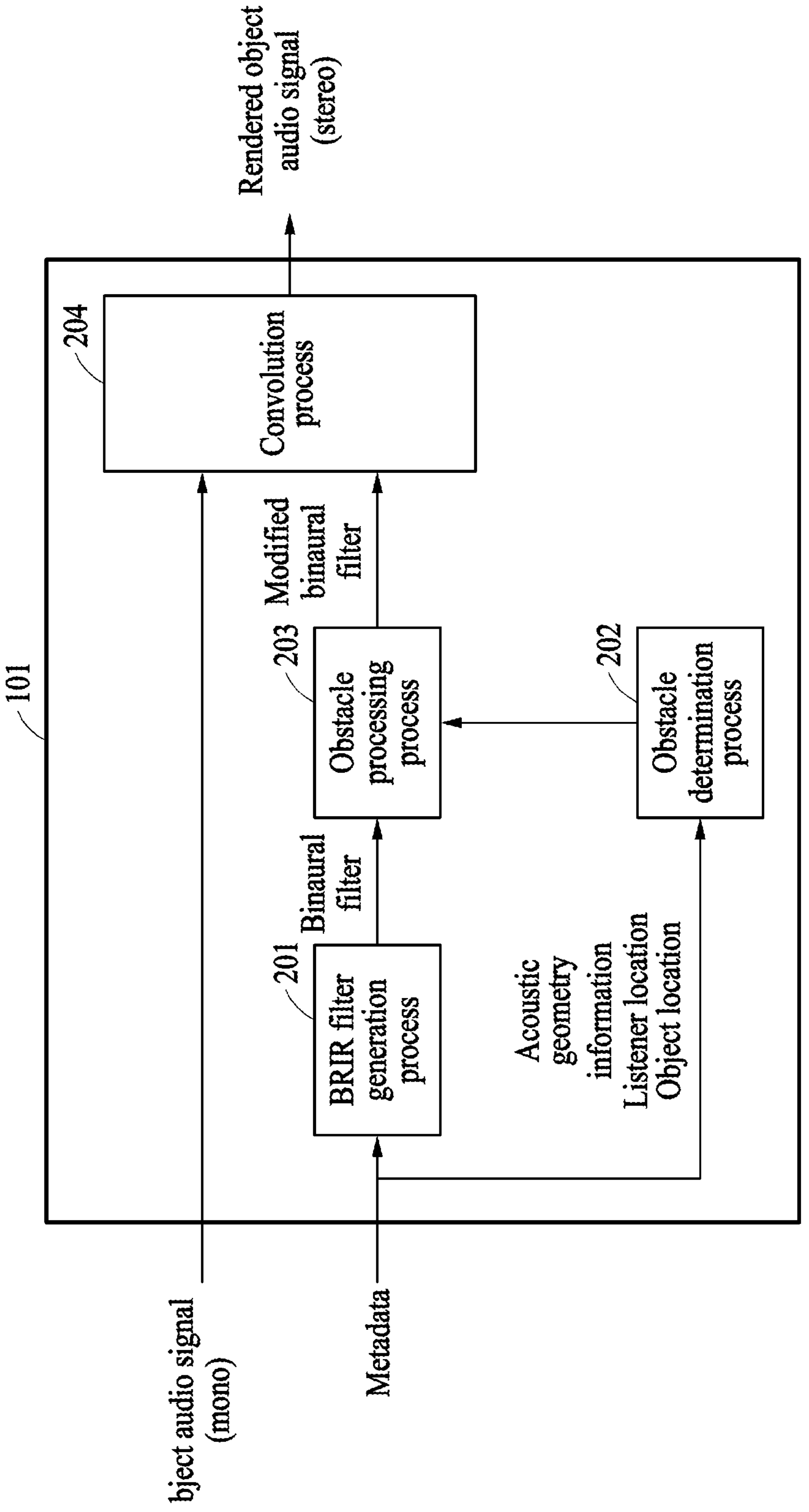
FIG. 2 is a block diagram illustrating processes processed by a rendering apparatus according to a first example embodiment.

FIG. 2 is a block diagram illustrating processes processed by a rendering apparatus according to a first example embodiment.

In the rendering apparatus 101, a binaural room impulse response (BRIR) filter generation process 201, an obstacle determination process 202, an obstacle processing process 203, and a convolution process 204 may be performed by a processor of the rendering apparatus 101.

The rendering apparatus 101 may identify an object audio signal, which is a mono signal, as an input signal. The rendering apparatus 101 may identify metadata. The metadata may include a gain of the audio signal, a distance between a sound source and the audio signal, a location of a listener, a location of the sound source, and acoustic geometry information, and the like.

In the BRIR filter generation process 201, the rendering apparatus 101 may generate a binaural filter based on the metadata using a BRIR. For a method for generating the binaural filter using the metadata to render an object-based mono signal and an object-based stereo signal, a method that a person skilled in the art is able to easily employ may be used.

The binaural filter may include direct reflection sound control information, early reflection sound control information, and late reverberation sound control information. The binaural filter may refer to a transfer function between an audio sound source and both ears of a person. For example, the binaural filter may be the BRIR. For example, the BRIR may be acquired by installing microphones on the ears of the person and measuring an impulse response between a sound from a sound source and the microphones installed on the ears of the person. However, since it is difficult to acquire the binaural filter through an actual measurement method, the binaural filter may be directly synthesized using a head transfer function, early reflection sound (direct reflection sound), late reverberation, and the like.

In the obstacle determination process 202, the rendering apparatus 101 may determine, based on the metadata, whether an obstacle is present between a listener and an object. The rendering apparatus 101 may determine a direct sound transmission path of an input signal and a direct reflection sound transmission path of the input signal. The rendering apparatus 101 may determine, based on the direct sound transmission path and the direct reflection sound transmission path, whether the obstacle is present. A direct sound and a reflection sound may be acquired according to an image source method or a ray tracing method. In this case, a direct sound of an acoustic object may refer to a direct path between the acoustic object and the listener, and a direct reflection sound may refer to a path through which the acoustic object is reflected off a wall, ceiling, or floor, and is transmitted to a person. The image source method may be a method for calculating a reflection sound transmission path between a virtual sound source and a listener by assuming that a virtual space is present behind a reflective surface and the virtual sound source is present therein. In addition, the ray tracing method may refer to a method for finding a reflection sound path by tracking several rays that are outputted from a sound source, which is an acoustic object, and reflected by a wall surface and the like, and assuming that a sound is transmitted to a receiver through a path from the sound source to the receiver, when the rays pass through the receiver (or detector).

For example, when the obstacle is present on a straight line that connects the listener and the sound source, which is the direct sound transmission path, the rendering apparatus 101 may determine that the obstacle is present in the direct sound transmission path.

For example, when the obstacle is present in a direct reflection sound transmission path, the rendering apparatus 101 may determine that the obstacle is present in the direct reflection sound transmission path.

For example, N different paths may be predetermined for the direct reflection sound transmission path, and the rendering apparatus 101 may determine whether the obstacle is present with respect to a direct reflection sound with the N different paths, and verify the number of paths with the obstacle M. N may be a positive natural number, and M may be a positive natural number less than or equal to N.

In the obstacle processing process 203, the rendering apparatus 101 may modify, based on whether the obstacle is present, the binaural filter. For example, when it is determined that no obstacle is present, the rendering apparatus 101 may not modify the binaural filter. However, when it is determined that the obstacle is present, the rendering apparatus 101 may modify the binaural filter.

For example, the rendering apparatus 101 may modify the direct reflection sound control information and the early reflection sound control information included in the binaural filter. For example, when it is determined that the obstacle is present in the direct sound transmission path, the rendering apparatus 101 may modify the direct sound control information so as to reduce a gain of the direct sound. For example, when it is determined that the obstacle is present in the direct sound transmission path, the rendering apparatus 101 may modify the direct sound control information using a low pass filter.

For example, when no obstacle is present, N different paths may be predetermined for the direct reflection sound transmission path, and the rendering apparatus 101 may determine, based on the predetermined N direct reflection sound transmission paths, whether the obstacle is present in each path, verify the number of paths with the obstacle (for example, M), and determine a ratio (M/N) of the number of direct reflection sound paths with the obstacle to the total number of direct reflection sound paths. The rendering apparatus 101 may increase transformation of the BRIR by increasing a transformation intensity of the binaural filter as the determined ratio is higher. The rendering apparatus 101 may reduce transformation of the BRIR by lowering the transformation intensity of the binaural filter as the determined ratio is lower.

For example, when no obstacle is present, N different paths may be predetermined for the direct reflection sound transmission path, and the rendering apparatus 101 may determine, based on a case where direct reflection sound transmission paths are different from the predetermined N transmission paths, a ratio of the number of transmission paths with the obstacle to the number of direct reflection sound transmission paths. The rendering apparatus 101 may increase transformation of the BRIR by increasing an intensity of the binaural filter as the determined ratio is higher. The rendering apparatus 101 may reduce transformation of the BRIR by lowering the intensity of the binaural filter as the determined ratio is lower.

For example, the rendering apparatus 101 may transform the binaural filter, based on the ratio of the number of direct reflection sound paths with the obstacle M to the total number of direct reflection sound paths N.

When M/N is greater than a reference, it may be interpreted that many obstacles are present in a direct reflection sound, and thus the rendering apparatus 101 may reduce a gain of an audio signal to be higher than the reference, or reduce a frequency response magnitude to be greater than the reference when the low pass filter is used. Conversely, when M/N is less than or equal to the reference, it may be interpreted that few obstacles are present in the direct reflection sound, and thus the rendering apparatus 101 may reduce the gain of the audio signal to be less than the reference, or reduce the frequency response magnitude to be less than the reference when the low pass filter is used.

In the convolution process 204, the rendering apparatus 101 may generate a rendered output signal by convolving the modified binaural filter and the input signal. The rendered output signal may be a rendered object audio signal. The rendered output signal may be a stereo signal.

Figure 3:
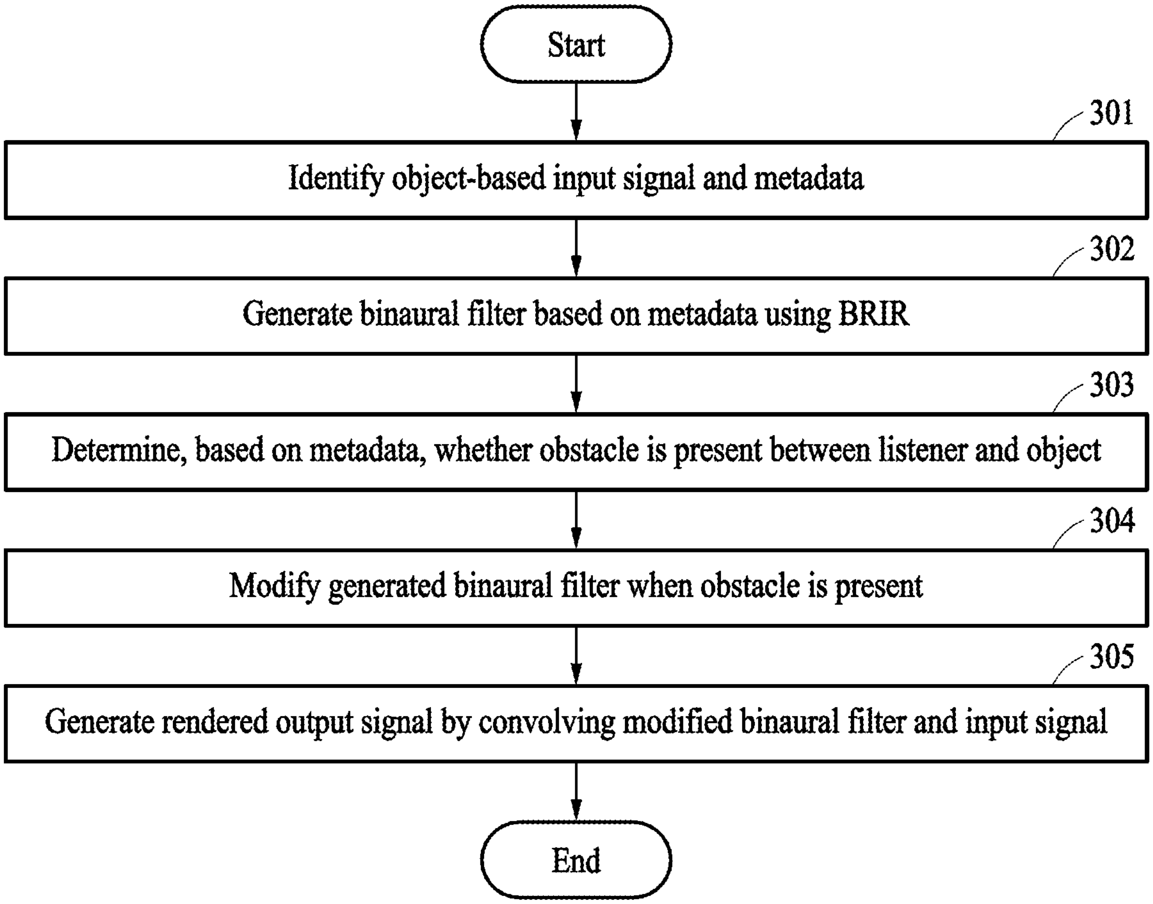
FIG. 3 is a flowchart illustrating a rendering method according to a first example embodiment.

FIG. 3 is a flowchart illustrating a rendering method according to a first example embodiment.

In operation 301, a rendering apparatus may identify an object-based input signal and metadata for the input signal. The rendering apparatus may identify an object audio signal, which is a mono signal, as the input signal. The rendering apparatus may identify the metadata. The metadata may include a gain of the audio signal, a distance between a sound source and the audio signal, a location of a listener, a location of the sound source, acoustic geometry information, and the like.

In operation 302, the rendering apparatus may generate a binaural filter based on the metadata using a BRIR. The binaural filter may include direct reflection sound control information, early reflection sound control information, and late reverberation sound control information.

In operation 303, the rendering apparatus may determine, based on the metadata, whether an obstacle is present between the listener and an object. The rendering apparatus may determine, based on the location of the listener, the location of the sound source, and the acoustic geometry information included in the metadata, whether the obstacle is present.

The rendering apparatus may determine a direct sound transmission path of the input signal and a direct reflection sound transmission path of the input signal, and determine, based on the direct sound transmission path and the direct reflection sound transmission path, whether the obstacle is present.

In operation 304, the rendering apparatus may modify the generated binaural filter when it is determined that the obstacle is present. The rendering apparatus may modify the direct reflection sound control information included in the generated binaural filter and the early reflection sound control information included in the generated binaural filter.

In operation 305, the rendering apparatus may generate a rendered output signal by convolving the modified binaural filter and the input signal. The rendered output signal may be a rendered object audio signal. The rendered output signal may be a stereo signal.

Figure 4:
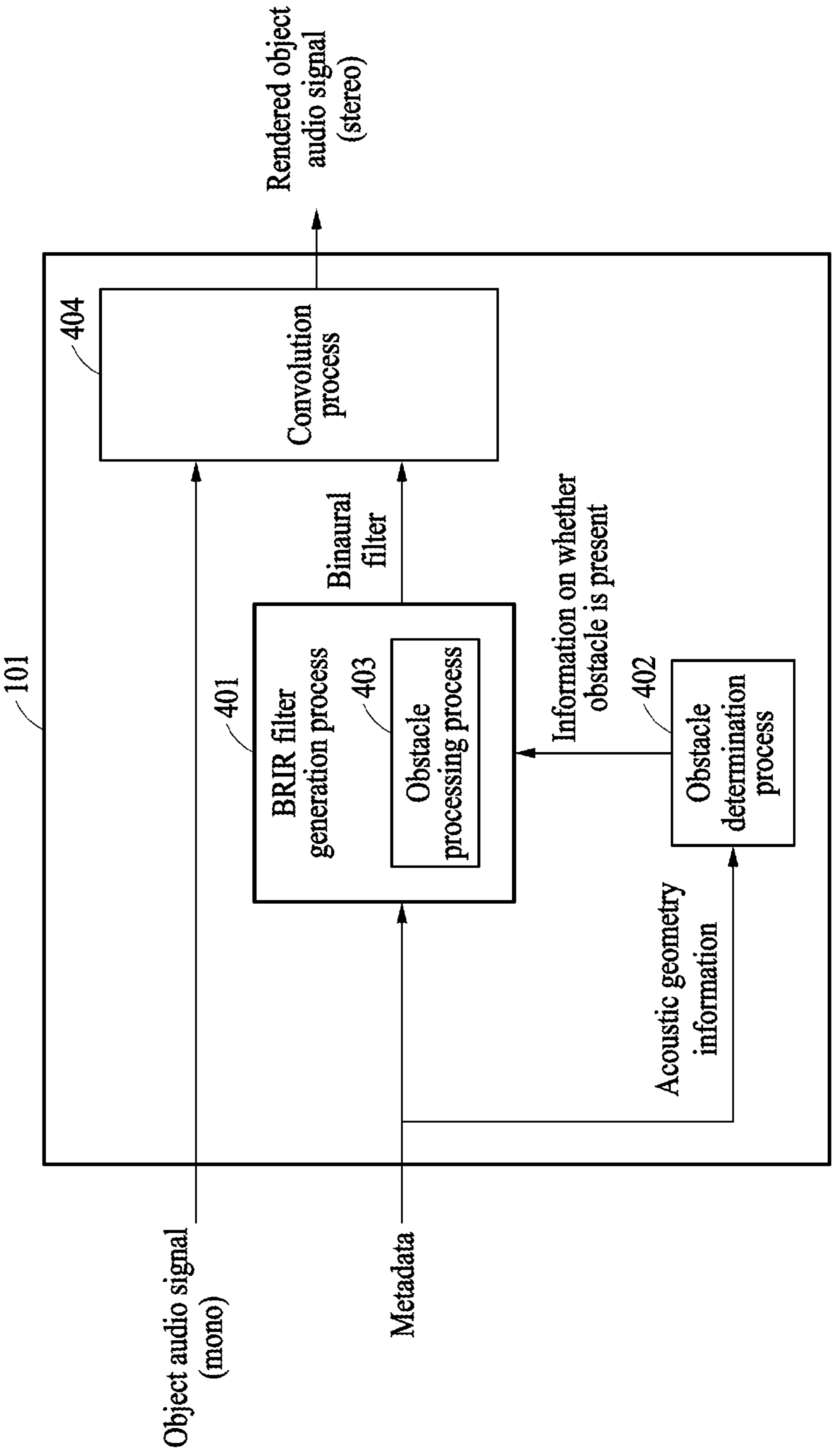
FIG. 4 is a block diagram illustrating processes processed by a rendering apparatus according to a second example embodiment.

FIG. 4 is a block diagram illustrating processes processed by a rendering apparatus according to a second example embodiment.

In the second example embodiment, the rendering apparatus 101 may generate a binaural filter considering whether an obstacle is present in generating the binaural filter, and may generate an output signal by rendering an input signal using the generated binaural filter.

In the rendering apparatus 101, a BRIR filter generation process 401, an obstacle determination process 402, an obstacle processing process 403, and a convolution process 404 may be performed by a processor of the rendering apparatus 101.

The rendering apparatus 101 may identify an object audio signal, which is a mono signal, as an input signal. The rendering apparatus 101 may identify metadata. The metadata may include a gain of the audio signal, a distance between a sound source and the audio signal, a location of a listener, a location of the sound source, acoustic geometry information, and the like.

In the obstacle determination process 402, the rendering apparatus 101 may determine, based on the metadata, whether the obstacle is present between the listener and an object. The rendering apparatus 101 may determine a direct sound transmission path of the input signal and a direct reflection sound transmission path of the input signal. The rendering apparatus 101 may determine, based on the direct sound transmission path and the direct reflection sound transmission path, whether the obstacle is present.

For example, when the direct sound transmission path is not on a straight line that connects the listener and the sound source, the rendering apparatus 101 may determine that the obstacle is present. For example, when the direct sound transmission path is not on the straight line that connects the listener and the sound source, the rendering apparatus 101 may determine that the obstacle is present in the direct sound transmission path.

For example, when no obstacle is present, the direct sound transmission path and the direct reflection sound transmission path may be predetermined according to a space, and the rendering apparatus 101 may determine that the obstacle is present, when the calculated direct sound transmission path and direct reflection sound transmission path are different from a predetermined transmission path.

For example, when no obstacle is present, N different paths may be predetermined for the direct reflection sound transmission path. When direct reflection sound transmission paths are different from the predetermined N transmission paths, the rendering apparatus 101 may determine that the obstacle is present. N may be a positive natural number.

For example, when the obstacle is present on the straight line that connects the listener and the sound source, which is the direct sound transmission path, the rendering apparatus 101 may determine that the obstacle is present in the direct sound transmission path.

For example, when the obstacle is present in the direct reflection sound transmission path, the rendering apparatus 101 may determine that the obstacle is present in the direct reflection sound transmission path.

For example, N different paths may be predetermined for the direct reflection sound transmission path, and the rendering apparatus 101 may determine whether the obstacle is present with respect to a direct reflection sound with the N different paths, and verify the number of paths with the obstacle M. N may be a positive natural number, and M may be a positive natural number less than or equal to N.

The obstacle processing process 403 may be performed along with the BRIR filter generation process 401. In generating a binaural filter based on metadata using a BRIR, the rendering apparatus 101 may generate the binaural filter according to whether the obstacle is present.

For example, when it is determined that no obstacle is present, the rendering apparatus 101 may generate, based on the metadata, the binaural filter. For a method for generating the binaural filter using the metadata to render an object-based mono signal and an object-based stereo signal, a method that a person skilled in the art is able to easily employ may be used.

For example, when it is determined that the obstacle is present, the rendering apparatus 101 may generate the binaural filter by modifying direct reflection sound control information and early reflection sound control information included in the binaural filter. The binaural filter may include the direct reflection sound control information, the early reflection sound control information, and late reverberation sound control information.

For example, when it is determined that the obstacle is present in the direct sound transmission path, the rendering apparatus 101 may generate the binaural filter by setting the direct sound control information so as to reduce a gain of a direct sound. For example, when it is determined that the obstacle is present in the direct sound transmission path, the rendering apparatus 101 may generate the binaural filter including the direct sound control information that is set using a low pass filter.

For example, when no obstacle is present, N different paths may be predetermined for a direct reflection sound transmission path, and the rendering apparatus 101 may determine, based on the predetermined N direct reflection sound transmission paths, whether the obstacle is present in each path, verify the number of paths with the obstacle (for example, M), and determine a ratio (M/N) of the number of direct reflection sound paths with the obstacle to the total number of direct reflection sound paths. The rendering apparatus 101 may increase transformation of the BRIR by increasing a transformation intensity of the binaural filter as the determined ratio is higher. The rendering apparatus 101 may reduce transformation of the BRIR by lowering the transformation intensity of the binaural filter as the determined ratio is lower.

In the convolution process 404, the rendering apparatus 101 may generate a rendered output signal by convolving the modified binaural filter and the input signal. The rendered output signal may be a rendered object audio signal. The rendered output signal may be a stereo signal.

Figure 5:
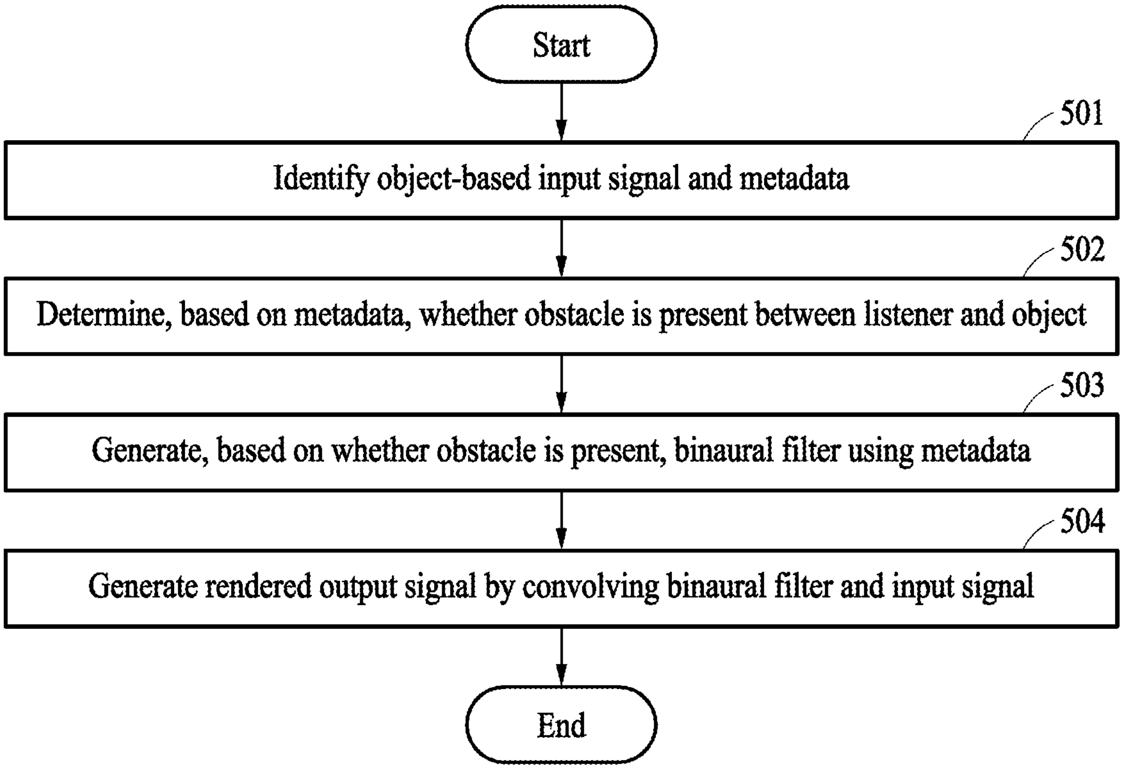
FIG. 5 is a flowchart illustrating a rendering method according to a second example embodiment.

FIG. 5 is a flowchart illustrating a rendering method according to a second example embodiment.

In operation 501, a rendering apparatus may identify an object-based input signal and metadata for the input signal. The rendering apparatus may identify an object audio signal, which is a mono signal, as the input signal. The rendering apparatus may identify the metadata. The metadata may include a gain of the audio signal, a distance between a sound source and the audio signal, a location of a listener, a location of the sound source, acoustic geometry information, and the like.

In operation 502, the rendering apparatus may determine, based on the metadata, whether an obstacle is present between the listener and an object. The rendering apparatus may determine, based on the location of the listener, the location of the sound source, and the acoustic geometry information included in the metadata, whether the obstacle is present.

The rendering apparatus may determine a direct sound transmission path of the input signal and a direct reflection sound transmission path of the input signal, and determine, based on the direct sound transmission path and the direct reflection sound transmission path, whether the obstacle is present.

In operation 503, the rendering apparatus may generate a binaural filter using the metadata according to whether the determined obstacle is present. When it is determined that the obstacle is present, the rendering apparatus may generate the binaural filter by modifying direct reflection sound control information and early reflection sound control information included in the binaural filter. In operation 504, the rendering apparatus may generate a rendered output signal by convolving the binaural filter and the input signal.

Figure 6:
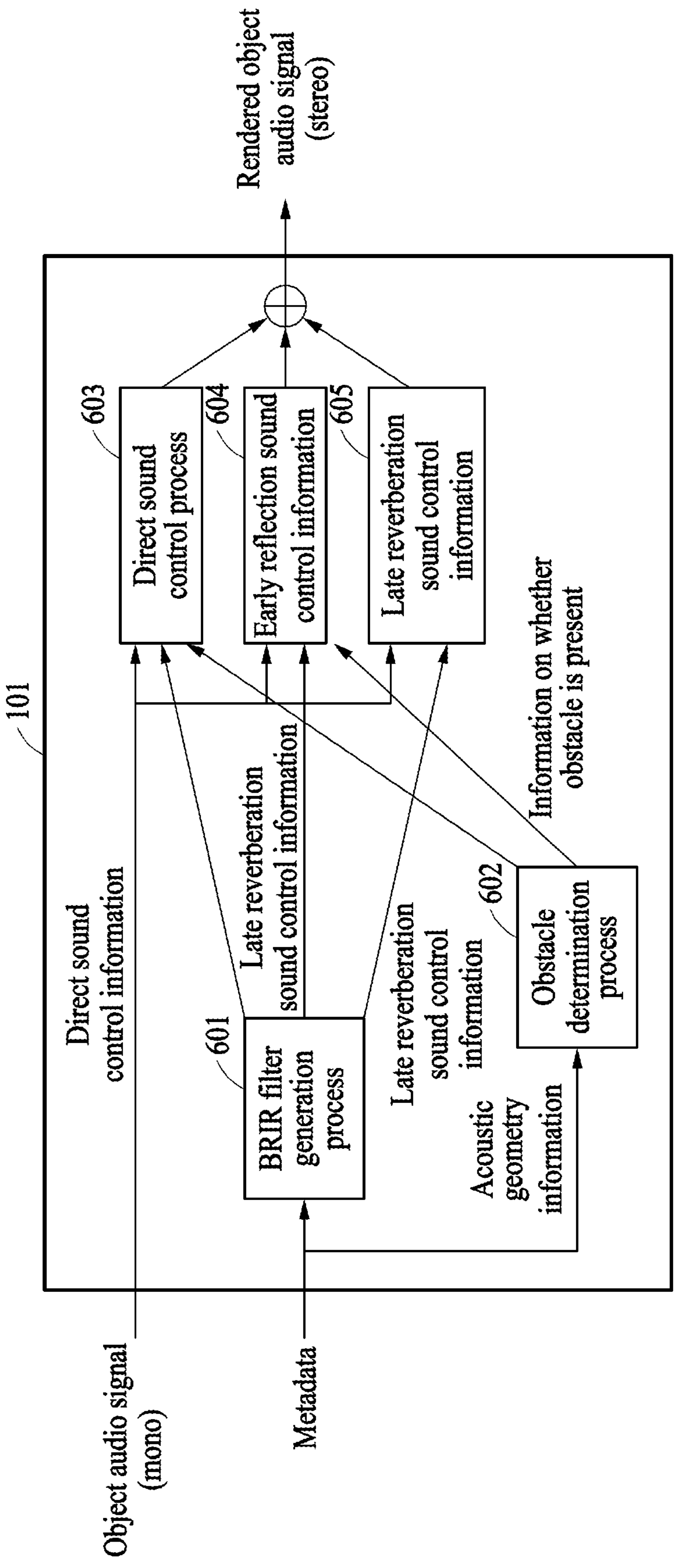
FIG. 6 is a block diagram illustrating processes processed by a rendering apparatus according to a third example embodiment.

FIG. 6 is a block diagram illustrating processes processed by a rendering apparatus according to a third example embodiment.

In the third example embodiment, the rendering apparatus 101 may generate a binaural filter, modify, without convolution between an input signal and the binaural filter, a direct sound of the input signal, an early reflection sound of the input signal, and a late reverberation sound of the input signal according to whether an obstacle is present, and generate a rendered output signal by mixing results of the modification.

In the rendering apparatus 101, a BRIR filter generation process 601, an obstacle determination process 602, a direct sound control process 603, an early reflection sound control process 604, and a late reverberation sound control process 605 may be performed by a processor of the rendering apparatus 101.

The rendering apparatus 101 may identify an object audio signal, which is a mono signal, as an input signal. The rendering apparatus 101 may identify metadata. The metadata may include a gain of the audio signal, a distance between a sound source and the audio signal, a location of a listener, a location of the sound source, and acoustic geometry information, and the like.

In the BRIR filter generation process 601, the rendering apparatus 101 may generate a binaural filter based on the metadata using a BRIR. For a method for generating the binaural filter using the metadata to render an object-based mono signal and an object-based stereo signal, a method that a person skilled in the art is able to easily employ may be used. The binaural filter may include direct reflection sound control information, early reflection sound control information, and late reverberation sound control information.

In the obstacle determination process 602, the rendering apparatus 101 may determine, based on the metadata, whether the obstacle is present between the listener and an object. The rendering apparatus 101 may determine a direct sound transmission path of the input signal and a direct reflection sound transmission path of the input signal. The rendering apparatus 101 may determine, based on the direct sound transmission path and the direct reflection sound transmission path, whether the obstacle is present.

For example, when the obstacle is present on a straight line that connects the sound source and the listener, which is the direct sound transmission path, the rendering apparatus 101 may determine that the obstacle is present in the direct sound transmission path.

For example, when the obstacle is present in the direct reflection sound transmission path, the rendering apparatus 101 may determine that the obstacle is present in the direct reflection sound transmission path.

For example, N different paths may be predetermined for the direct reflection sound transmission path, and the rendering apparatus 101 may determine whether the obstacle is present with respect to a direct reflection sound with the N different paths, and verify the number of paths with the obstacle M. N may be a positive natural number, and M may be a positive natural number less than or equal to N.

In the direct sound control process 603, the rendering apparatus 101 may modify, based on direct sound control information and whether the obstacle is present, the direct sound of the input signal. For example, when it is determined that the obstacle is present in the direct sound transmission path, the rendering apparatus 101 may modify the direct sound control information so as to reduce a gain of the direct sound. For example, when it is determined that the obstacle is present in the direct sound transmission path, the rendering apparatus 101 may modify the direct sound control information using a low pass filter.

In the early reflection sound control process 604, the rendering apparatus 101 may modify, based on early reflection sound control information and whether the obstacle is present, the early reflection sound of the input signal. For example, when no obstacle is present, N different paths may be predetermined for the direct reflection sound transmission path, and the rendering apparatus 101 may determine, based on a case where direct reflection sound transmission paths are different from the predetermined N transmission paths, a ratio of the number of transmission paths with the obstacle to the number of direct reflection sound transmission paths. The rendering apparatus 101 may increase transformation of a BRIR as the determined ratio is higher.

In the late reverberation sound control process 605, the rendering apparatus 101 may modify, based on late reverberation sound control information and whether the obstacle is present, the late reverberation sound of the input signal. When no obstacle is present, the rendering apparatus 101 may not modify the late reverberation sound.

When it is determined that the obstacle is present between the listener and the sound source, the rendering apparatus 101 may generate a rendered output signal by mixing the modified direct sound of the input signal, the modified early reflection sound of the input signal, and the modified late reverberation sound of the input signal.

Figure 7:
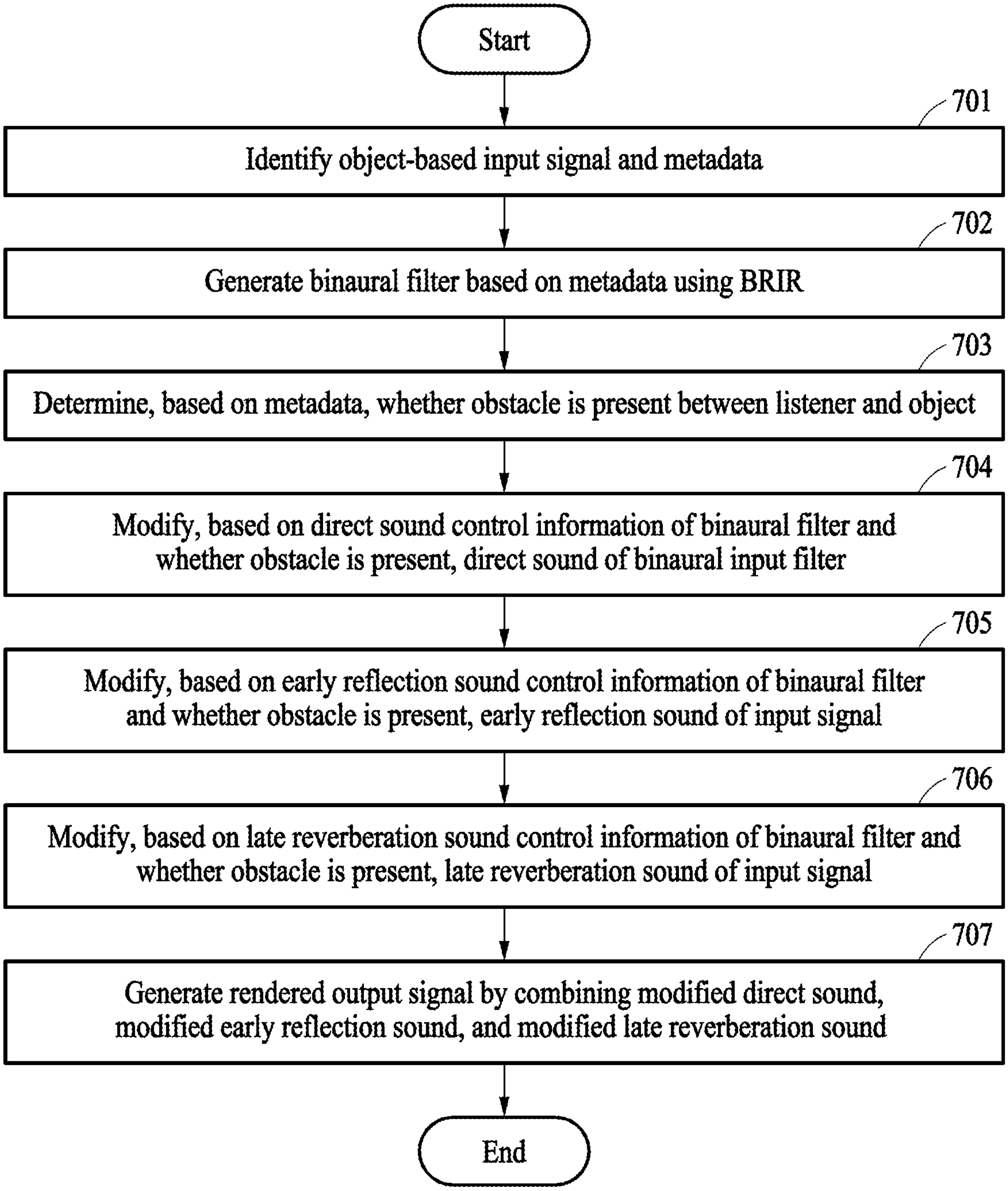
FIG. 7 is a flowchart illustrating a rendering method according to a third example embodiment.

FIG. 7 is a flowchart illustrating a rendering method according to a third example embodiment.

In operation 701, a rendering apparatus may identify an object-based input signal and metadata for the input signal. The rendering apparatus may identify the metadata. The metadata may include a gain of the audio signal, a distance between a sound source and the audio signal, a location of a listener, a location of the sound source, acoustic geometry information, and the like.

In operation 702, the rendering apparatus may generate a binaural filter based on the metadata using a BRIR. The rendering apparatus may identify an object audio signal, which is a mono signal, as the input signal. In the rendering apparatus, the binaural filter may include direct sound control information, early reflection sound control information, and late reverberation sound control information of the input signal.

In operation 703, the rendering apparatus may determine, based on the metadata, whether an obstacle is present between the listener and an object. The rendering apparatus may determine, based on the location of the listener, the location of the sound source, and the acoustic geometry information included in the metadata, whether the obstacle is present.

The rendering apparatus may determine a direct sound transmission path of the input signal and a direct reflection sound transmission path of the input signal, and determine, based on the direct sound transmission path and the direct reflection sound transmission path, whether the obstacle is present.

The rendering apparatus may determine a direct sound transmission path of the input signal and a direct reflection sound transmission path of the input signal, and determine, based on the direct sound transmission path and the direct reflection sound transmission path, whether the obstacle is present.

In operation 704, the rendering apparatus 101 may modify, based on the direct sound control information and whether the obstacle is present, a direct sound of the input signal. For example, when it is determined that the obstacle is present in the direct sound transmission path, the rendering apparatus 101 may modify the direct sound control information so as to reduce a gain of the direct sound. For example, when it is determined that the obstacle is present in the direct sound transmission path, the rendering apparatus 101 may modify the direct sound control information using a low pass filter.

In operation 705, the rendering apparatus may modify, based on the early reflection sound control information and whether the obstacle is present, an early reflection sound of the input signal. In operation 706, the rendering apparatus 101 may modify, based on the late reverberation sound control information and whether the obstacle is present, a late reverberation sound of the input signal.

In operation 707, the rendering apparatus 101 may generate a rendered output signal by combining the modified direct sound of the input signal, the modified early reflection sound of the input signal, and the modified late reverberation sound of the input signal.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal, for processing by, or to control an operation of, a data processing apparatus, e.g., a programmable processor, a computer, or multiple computers. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and transmission media.

Although the present specification includes details of a plurality of specific example embodiments, the details should not be construed as limiting any invention or a scope that can be claimed, but rather should be construed as being descriptions of features that may be peculiar to specific example embodiments of specific inventions. Specific features described in the present specification in the context of individual example embodiments may be combined and implemented in a single example embodiment. On the contrary, various features described in the context of a single embodiment may be implemented in a plurality of example embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In a specific case, multitasking and parallel processing may be advantageous. In addition, it should not be understood that the separation of various device components of the aforementioned example embodiments is required for all the example embodiments, and it should be understood that the aforementioned program components and apparatuses may be integrated into a single software product or packaged into multiple software products.

The example embodiments disclosed in the present specification and the drawings are intended merely to present specific examples in order to aid in understanding of the present disclosure, but are not intended to limit the scope of the present disclosure. It will be apparent to those skilled in the art that various modifications based on the technical spirit of the present disclosure, as well as the disclosed example embodiments, can be made.

What is claimed is:

1. A method for rendering an object-based audio signal, the method comprising:

identifying an object-based input signal and metadata for the input signal;

generating a binaural filter based on the metadata using a binaural room impulse response (BRIR);

determining, based on the metadata, whether an obstacle is present between a listener and an object;

modifying the generated binaural filter when it is determined that the obstacle is present; and generating a rendered output signal by convolving the modified binaural filter and the input signal, wherein the modifying of the generated binaural filter comprises modifying direct reflection sound control information and early reflection sound control information included in the generated binaural filter, and wherein the modifying of the generated binaural filter comprises modifying direct sound control information to reduce a gain of a direct sound of the input signal.

2. The method of claim 1, wherein the determining of whether the obstacle is present comprises determining, based on a location of the listener, and a location of a sound source and acoustic geometry information included in the metadata, whether the obstacle is present.

3. The method of claim 1, wherein the determining of whether the obstacle is present comprises determining a direct sound transmission path of the input signal and a direct reflection sound transmission path of the input signal, and determining, based on the direct sound transmission path and the direct reflection sound transmission path, whether the obstacle is present.

4. The method of claim 1, wherein the modifying of the generated binaural filter comprises determining, based on a ratio of the number of direct reflection sound paths with the obstacle to the total number of initially set direct reflection sound paths, a degree of modification of the early reflection sound control information included in the binaural filter.

* * * * *